July 7, 1964  G. DETTMER  3,140,327
PROCESS FOR MANUFACTURING BELLOWS
Filed Oct. 23, 1961
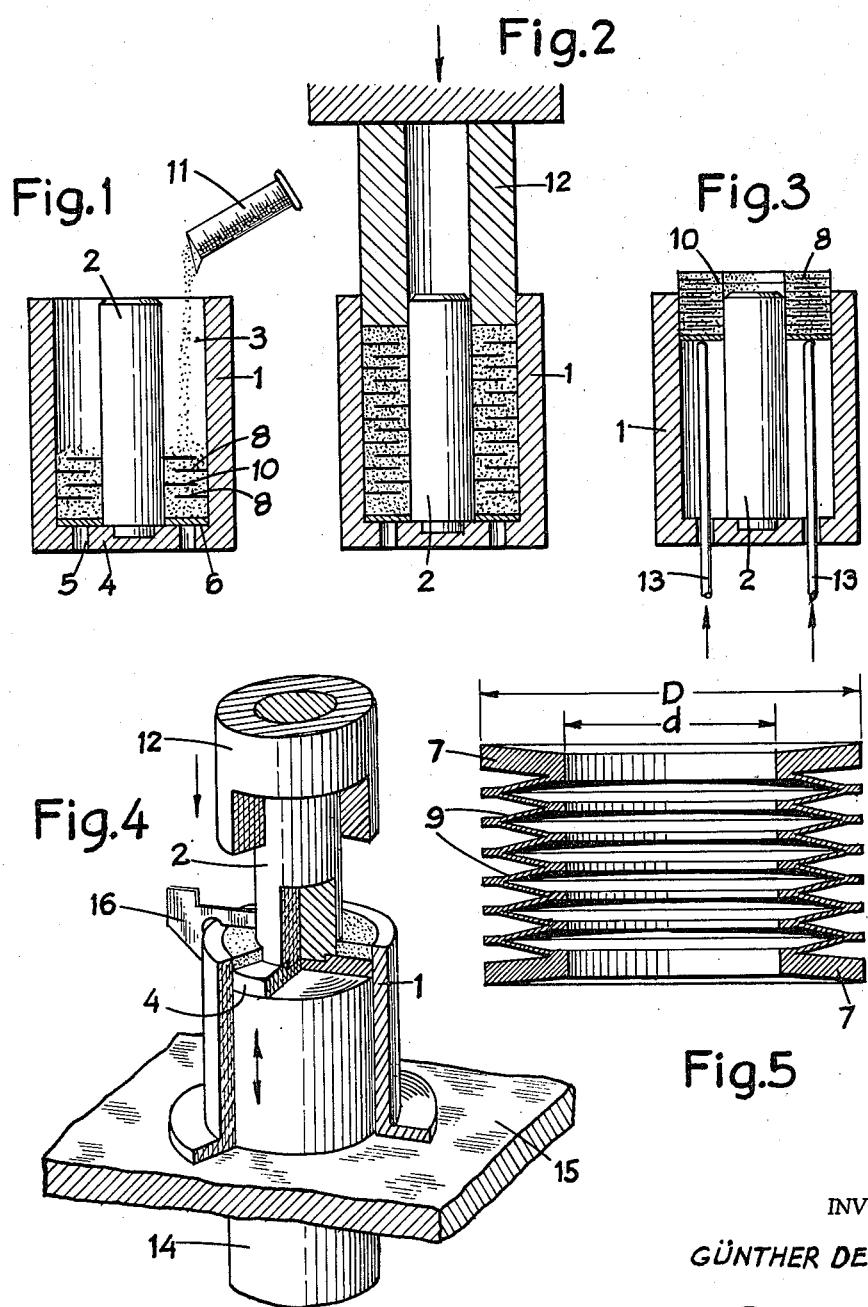
INVENTOR
GÜNTHER DETTMER
BY Toulmin & Toulmin
ATTORNEYS

United States Patent Office 3,140,327
Patented July 7, 1964

3,140,327
PROCESS FOR MANUFACTURING BELLOWS
Günther Dettmer, Schwarmstedt, Kreis Fallingbostel, Germany, assignor to Continental Gummi-Werke Aktiengesellschaft, Hannover, Germany
Filed Oct. 23, 1961, Ser. No. 147,024
Claims priority, application Germany Oct. 22, 1960
7 Claims. (Cl. 264—119)

The present invention relates to the manufacture of plastic bellows, more particularly, to a process for manufacturing bellows by the sintering of powdered plastics.

Because of the relatively poor elasticity of plastics generally employed in the manufacture of bellows, the production of bellows by molding has presented various problems. As a result, the use of non-cutting shaping processes which are employed in the manufacture of rubber articles has not been possible in the manufacture of plastic bellows except under vigorously controlled conditions and in the manufacture of bellows of the smallest sizes.

Bellows are generally produced from heavy blanks by machining such as on lathes. However, such machining is very time-consuming and uneconomical since there is a high degree of waste on the average of about 300 to 500%. This considerable waste occurs because the blank must be turned down until the bellows have wall thicknesses measured in fractions of millimeters.

It is therefore the principal object of the present invention to provide a novel and improved process for producing bellows by molding from plastic materials.

The present invention essentially comprises depositing a plastic which is in powder form into a cylindrical mold having a core therein. The plastic may be an ethylene polymer containing a halogen or similar plastics which are capable of being sintered. A plurality of annular separator discs is positioned in the plastic throughout the mold. These discs are of two different sizes and are alternatingly positioned. The larger size contacts the inner wall of the mold and the smaller size contacts the core. After all of the plastic and the separator discs have been assembled in the mold, the plastic is subjected to a heat treatment in which the powdered plastic is sintered together to form a bellows.

In this manner bellows of various sizes and shapes can be quickly and economically manufactured. There are no limitations with respect to the cross-section or to the dimensions. Since no mechanical treatment is necessary on the finished bellows, there is no waste material and the production of bellows which must be scrapped is practically excluded.

The separator discs may either be of a heat-resistant material and then removed when the bellows is completed or may be of a non-heat-resistent material so that the discs are destroyed during the heating process.

In practice it is possible to carry out the sintering process with the plastic and separator discs being removed from the mold. This can be accomplished by first compressing the plastic in the mold and then removing the compressed plastic. In this manner a small number of molds is required for the economical manufacture of a large number of bellows.

Other objects and advantages of the present invention will be apparent upon reference to the accompanying description when taken in conjunction with the following drawings, wherein FIGURES 1 through 3 are longitudinal sectional views of the mold of the present invention illustrating the principal steps of the process;

FIGURE 4 is a perspective view showing a modified form of the apparatus which can be used for carrying out the process of this invention; and FIGURE 5 is a longitudinal sectional view of the completed bellows with the bellows being in a slightly expanded position.

In order to produce a bellows such as illustrated in FIGURE 5, reference is made to FIGURES 1 through 3 which illustrate a cylindrical mold 1 having an interchangeable axial core 2. The interior diameter of the mold 1 corresponds to the exterior diameter D of the finished siphon and the diameter of the core corresponds to the inner diameter $d$ of the bellows after taking into account the shrinkage occurring during the heat-treating process.

The core 2 thus forms with the mold 1 an annular space 3 which is open at its top and closed at its bottom by an end plate 4 which has a plurality of holes 5 therein. The holes 5 are for the introduction of ejectors for removing the completed bellows from the mold.

In order to produce a bellows according to the present invention a flat annular disc 6 having an exterior diameter D and an interior diameter $d$ is first positioned on the bottom of the mold. The disc 6 covers the ejector holes 5 and also functions as a contact surface for the ejectors. The disc 6 is therefore formed from a rigid material, preferably a metal.

A loose layer of powdered plastic is then deposited on the annular disc 6. This plastic in powder form may be polytetrafluoroethylene, other ethylene polymers containing a halogen, or similar plastics which are capable of being sintered.

An annular separator disc 8 is then positioned on top of the initial layer of plastic. The external diameter of the separator disc is equal to D but the internal diameter of the separator disc is greater than $d$ by a distance of about twice the thickness of the wall at the folds 9 of the bellows. As a result, the outer edge of the separator disc 8 will engage the inner surface of the mold 1 over its entire periphery. However, its inner edge does not contact the core 2.

A second layer of powdered plastic is then deposited on top of the separator disc 8 and this layer is covered by another annular separator disc 10. The internal diameter of the separator disc 10 is equal to $d$ whereas its external diameter is smaller than D by about twice the thickness of the walls of the folds. Accordingly, the entire internal periphery of the separator disc 10 engages the core 2 while the outer periphery of the separator disc 10 does not contact the mold 1 but is spaced therefrom.

The separator discs 8 and 10 may comprise a heat-resistant material such as thin alloy sheets or other metal foils as well as a non-heat-resistant material which is destroyed during the heat treatment process. In the case of a heat-resistant material, the separator discs must be removed from the sintered bellows either by mechanically tearing the discs out or by dissolving the discs in an acid which does not attack the plastic material. Thus, the discs are removed mechanically or chemically by a process depending on the material from which the separator discs are made.

When the separator discs 8 and 10 are to be formed from non-heat-resistant material, paper or various types of cardboard may be satisfactorily used. The paper will already be burned before the sintering temperature of the plastic is reached. This temperature is in the range from 330 to 370° C. The ashes remaining between the folds of the bellows do not bond with the plastic and can be readily removed after completion of the sintering process by blowing them out with compressed air.

In addition, soft metal alloys, wax and other material may be used for forming the separator discs with the only limitation being that the materials do not bond with the sintered plastic during the heat treatment process.

The separator discs which are only used once are preferably punched out from plates or foils having a uniform thickness. Accordingly, the cross-section of the separator discs will be a flat rectangular one. The normal, unexpanded shape of the bellows manufactured by this process will accordingly be that of a nearly closed hollow cylinder in which the individual folds are spaced only by the thickness of the separator discs which were used. In some applications, however, it is desired that the normal shape of the bellows be an expanded position. In such a case, the separator discs can be initially shaped to have the corresponding cross-section. When flat separator discs are used, an expanded bellows can be obtained by an after-treatment of the sintered bellows. This comprises cooling the bellows after the sintering process, heating the bellows to a temperature in the range of the sintering temperature and then cooling the bellows again. By this treatment the expanded position of the bellows is fixed as a normal one.

The steps of depositing layers of powdered plastic and alternatingly positioning separator discs 8 and 10 above each layer are repeated until the desired number of folds is obtained. The final thickness of the walls of the bellows will depend on the weight or quantity of the powdered plastics comprising each layer. The weight of powdered plastic for each fold 9 can be initially calculated and then remains constant for all of the layers. A suitable dispensing unit for dispensing measured quantities of plastic material may be used such as indicated by the graduated vessel 11. Larger quantities of the powdered plastic are used only as the first and last layers of the bellows in order to form the end or connecting flanges 7.

When the bellows has been built up to a predetermined height, the powdered plastic is then compressed into a solid blank by means of a die 12 descending from above and being introduced into the annular opening 3 of the mold. Upon withdrawal of the die 12 the solid blank is then ejected by ejectors 13 which are inserted into the openings 5 from below. Instead of this mechanical ejector the holes 5 could be connected to a source of compressed air and the sudden application of compressed air against the end disc 6 would remove the compressed blank.

After removal of the plastic blank from the mold, the blank is freely sintered in a process known per se. After the sintered blank has been cooled, the separator discs 8 and 10 are removed as described previously. The resulting structure is a bellows in a non-expanded condition with the spaces between the folds corresponding to the thickness of the separator discs 8 and 10.

As an alternative to the above-described structure, the mold may be so constructed that the bottom 4 can be removed from the stationary mold and the die 12 would then act as an ejector.

Proceeding next to FIGURE 4 there is illustrated another embodiment of the apparatus of the present invention. In this embodiment the mold 1 is mounted on a table 15 of a press having a piston 14 which is axially movable with respect to the mold 1. Preferably, the piston 14 is infinitely variable so that it can stop in any desired position. The bottom 4 of the mold 1 is formed as a movable plate and is mounted on top of the piston 14. Thus, the die 12 and the piston 14 move coaxially with respect to the cylindrical mold 1.

With the above-described structure it is no longer necessary to precisely measure the quantities of the powdered plastic which are to be deposited in the mold as layers. In the beginning of the process of depositing the plastic in the mold, the bottom 4 is raised into a position whereby the quantity of plastic accommodated by the mold will be equal to the quantity of plastic necessary for the first layer. The mold is then filled with the powdered plastic up to the upper edge of the mold 1. Any excess plastic is then wiped off by a wiper plate 16 so that the remaining plastic is flush with the top edge of the mold 1. A separator disc is then positioned on this layer and the bottom 4 of the mold is lowered a certain distance equal to the thickness of the next layer of powdered plastic.

This process is repeated till the determined number of folds has been built up whereupon the plastic is then compressed by moving the die 12 downwardly thereon. The compressed blank is then removed from the mold by the piston 14. Since the movement of the piston 14 can be very accurately and precisely adjusted, an equal and uniform thickness of the walls of the folds of the bellows can be readily obtained without any difficulty.

While the present invention has been described in connection with forming bellows having a circular cross-section, it is pointed out that other cross-sections may be obtained. The cross-section of the bellows can be varied by a judicious selection of the mold 1 and the core 2.

Thus it can be seen that the present invention provides a simple, yet effective process for producing a bellows from a plastic material which can be sintered. The resulting bellows can have a multiplicity of shapes and the thickness of the bellows walls can be accurately controlled.

It will be understood that this invention is susceptible to modification in order to adapt it to different usages and conditions and, accordingly, it is desired to comprehend such modifications within this invention as may fall within the scope of the appended claims.

What is claimed as this invention is:

1. A process for producing a bellows by sintering of a powdered plastic and comprising the steps of depositing a powdered plastic into a mold, arranging annular separator discs in said powdered plastic so as to determine the thickness of the walls of the bellows and the folds therein, and sintering the powdered plastic to fuse the plastic into an integral bellows.

2. A process for producing a bellows by sintering of a powdered plastic and comprising the steps of depositing layers of powdered plastic in a smooth walled cylindrical mold having a core therein, placing annular separator discs upon each layer of powdered plastic with said discs alternately contacting the core and inner wall of said mold so as to alternately form the outer and inner walls of the bellows, and sintering the powdered plastic under pressure to fuse the plastic into an integral bellows.

3. A process for producing a bellows by sintering of a powdered plastic and comprising the steps of depositing a powdered plastic into a mold, arranging annular separator discs in said powdered plastic so as to determine the thickness of the walls of the bellows and the folds therein, sintering the powdered plastic to fuse the plastic into an integral bellows, and removing the separator discs after the sintering of the plastic.

4. A process for producing a bellows by sintering of a powdered plastic and comprising the steps of depositing a powdered plastic into a mold, arranging annular separator discs in said powdered plastic so as to determine the thickness of the walls of the bellows and the folds therein, said discs being of a non-heat-resistant material, and sintering the powdered plastic under pressure to fuse the plastic into an integral bellows while concurrently destroying said separator discs.

5. A process for producing a bellows by sintering of a powdered plastic and comprising the steps of measuring equal quantities of a powdered plastic, depositing the measured quantities of powdered plastic in layers in a smooth walled cylindrical mold having a core therein, placing annular separator discs upon each layer of powdered plastic with said discs alternately contacting the core and inner wall of said mold so as to alternately form the outer and inner walls of the bellows, and sintering the powdered plastic under pressure to fuse the plastic into an integral bellows.

6. A process for producing a bellows by sintering of a powdered plastic and comprising the steps of depositing layers of powdered plastic in a smooth walled cylindrical mold having a core therein, removing any excess plastic after the deposition of each layer so that the layers comprise equal quantities of plastic, placing annular separator discs upon each layer of powdered plastic with said discs alternately contacting the core and inner wall of said mold so as to alternately form the outer and inner walls of the bellows, and sintering the powdered plastic under pressure to fuse the plastic into an integral bellows.

7. A process for producing a bellows by sintering of a powdered plastic and comprising the steps of depositing a powdered plastic into a mold, arranging annular separator discs in said powdered plastic so as to determine the thickness of the walls of the bellows and the folds therein, sintering the powdered plastic to fuse the plastic into an integral bellows, expanding the bellows after being cooled, heating the expanded bellows to a temperature in the range of the sintering temperature, and cooling the bellows so that the final bellows is normally in an expanded position.

References Cited in the file of this patent

UNITED STATES PATENTS

| | | |
|---|---|---|
| 1,679,408 | Davis et al. | Aug. 7, 1928 |
| 1,926,628 | Morehouse | Sept. 12, 1933 |
| 2,259,094 | Wellman | Oct. 14, 1941 |
| 2,396,629 | Alfthan et al. | Mar. 19, 1946 |
| 2,558,823 | Crowley et al. | July 3, 1951 |
| 2,602,962 | Deakin | July 15, 1952 |
| 2,685,507 | Blood | Aug. 3, 1954 |
| 2,751,293 | Haller | June 19, 1956 |
| 2,939,178 | Haroldson et al. | June 7, 1960 |

FOREIGN PATENTS

| | | |
|---|---|---|
| 820,544 | Great Britain | Sept. 23, 1959 |